(12) United States Patent
Bregman et al.

(10) Patent No.: US 11,366,743 B2
(45) Date of Patent: Jun. 21, 2022

(54) COMPUTING RESOURCE COVERAGE

(71) Applicant: Red Hat Israel, Ltd., Ra'anana (IL)

(72) Inventors: Arie Bregman, Gan Yavne (IL); Eran Kuris, Holon (IL); Alexander Stafeyev, Bet shemes (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 16/268,988

(22) Filed: Feb. 6, 2019

(65) Prior Publication Data
US 2020/0250077 A1 Aug. 6, 2020

(51) Int. Cl.
G06F 11/36 (2006.01)
G06F 9/50 (2006.01)
G06F 9/54 (2006.01)
G06F 8/36 (2018.01)

(52) U.S. Cl.
CPC ............ *G06F 11/3676* (2013.01); *G06F 8/36* (2013.01); *G06F 9/5027* (2013.01); *G06F 9/54* (2013.01); *G06F 11/3684* (2013.01)

(58) Field of Classification Search
CPC ............. G06F 11/3688; G06F 11/3664; G06F 11/3672; G06F 11/3433; G06F 11/3684; G06F 11/30; G06F 11/3612; G06F 11/3676; G06F 11/3692; G06F 9/50; G06F 9/5027; G06F 9/54; G06F 8/36
See application file for complete search history.

(56) References Cited

U.S. PATENT DOCUMENTS

| | | | |
|---|---|---|---|
| 7,480,842 B1* | 1/2009 | Young | G06F 11/263 714/725 |
| 9,117,027 B2 | 8/2015 | Dayal et al. | |
| 9,141,379 B2 | 9/2015 | Boden et al. | |
| 9,444,717 B1* | 9/2016 | Aithal | H04L 43/50 |
| 9,876,703 B1* | 1/2018 | Arllen | H04L 41/145 |
| 10,402,227 B1* | 9/2019 | Kinney, Jr. | G06F 9/4881 |
| 2007/0006041 A1* | 1/2007 | Brunswig | G06F 11/3688 714/38.14 |

(Continued)

OTHER PUBLICATIONS

Wang et al., Testing Cloud Applications under Cloud-Uncertainty Performance Effects; http://www.cs.utsa.edu/~wwang/papers/ICST18.pdf; retrieved Dec. 28, 2018; pp. 1-12.

(Continued)

*Primary Examiner* — S. Sough
*Assistant Examiner* — Cheneca Smith
(74) *Attorney, Agent, or Firm* — K&L Gates LLP

(57) ABSTRACT

Computing resource coverage is disclosed. In an example, a computing resource (CR) pool includes a plurality of CR types hosted on a plurality of hosts, where the plurality of CR types are routinely updated. A test repository stores a plurality of test cases (TC). A processor is configured to execute a testing service to compile, from a plurality of test daemons, a CR manifest of the CR types included in the CR pool. A TC manifest is compiled, including CR types tested by the plurality of TCs. The CR types included in the CR manifest are compared with the CR types included in the TC manifest. A test coverage report of tested and untested CR types is generated. A TC is added to the test repository based on the test coverage report.

20 Claims, 10 Drawing Sheets

(56) References Cited

U.S. PATENT DOCUMENTS

| | | | | |
|---|---|---|---|---|
| 2008/0155100 | A1* | 6/2008 | Ahmed | G06F 9/5061 |
| | | | | 709/226 |
| 2010/0138833 | A1* | 6/2010 | Franklin | G06F 11/3676 |
| | | | | 718/100 |
| 2015/0067648 | A1* | 3/2015 | Sivanesan | G06F 11/3684 |
| | | | | 717/124 |
| 2015/0207752 | A1* | 7/2015 | Birkestrand | G06F 9/5027 |
| | | | | 709/226 |
| 2019/0361799 | A1* | 11/2019 | Wojciak | G06F 11/3684 |
| 2020/0242010 | A1* | 7/2020 | Hicks | G06F 11/3616 |

OTHER PUBLICATIONS

AWS Resource Groups User Guide; Jun. 29, 2018; https://docs.aws amazon.com/ARG/latest/userguide/resgrps-ug.pdf; retrieved Dec. 31, 2018; pp. 1-41.

* cited by examiner

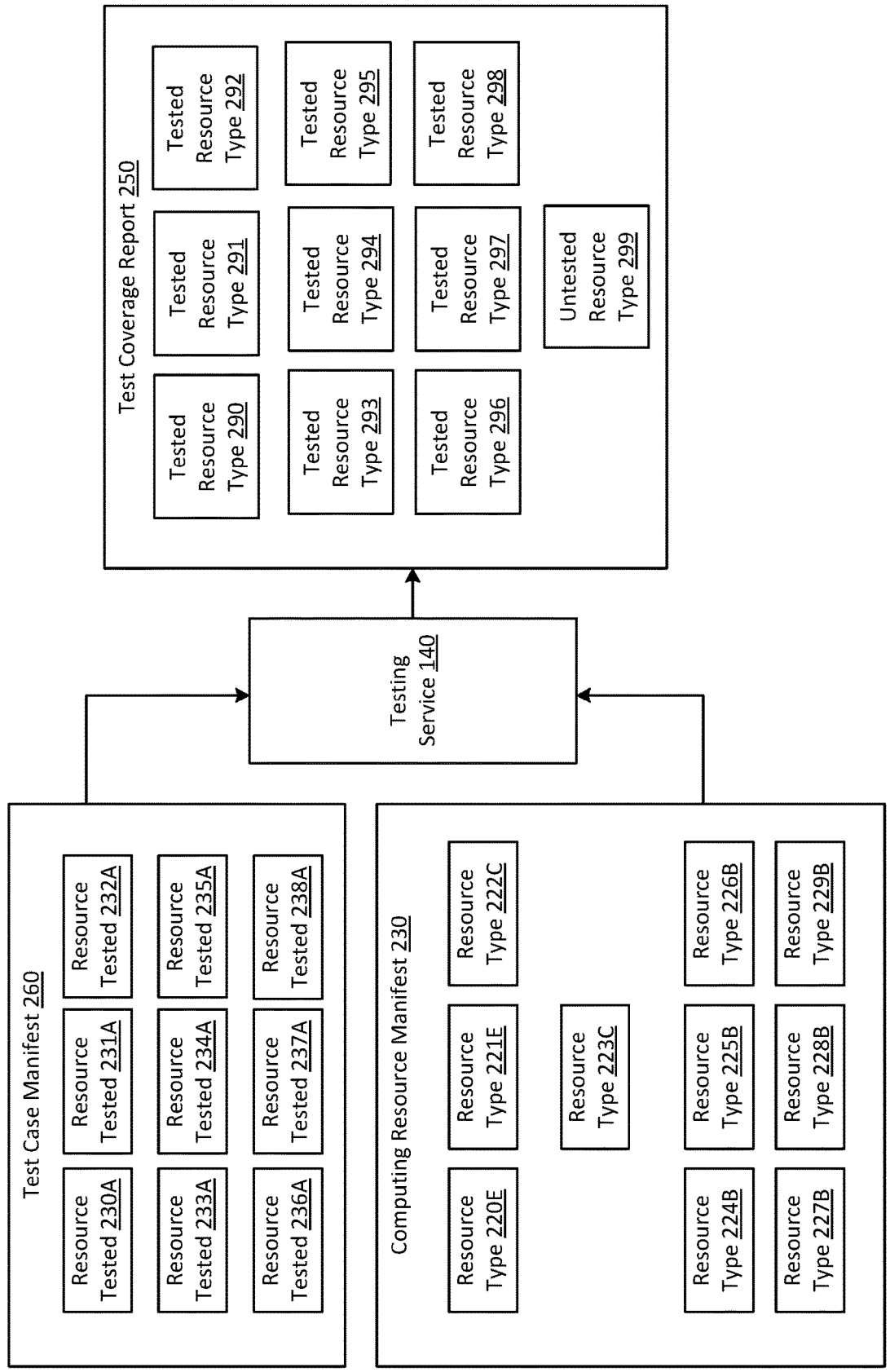

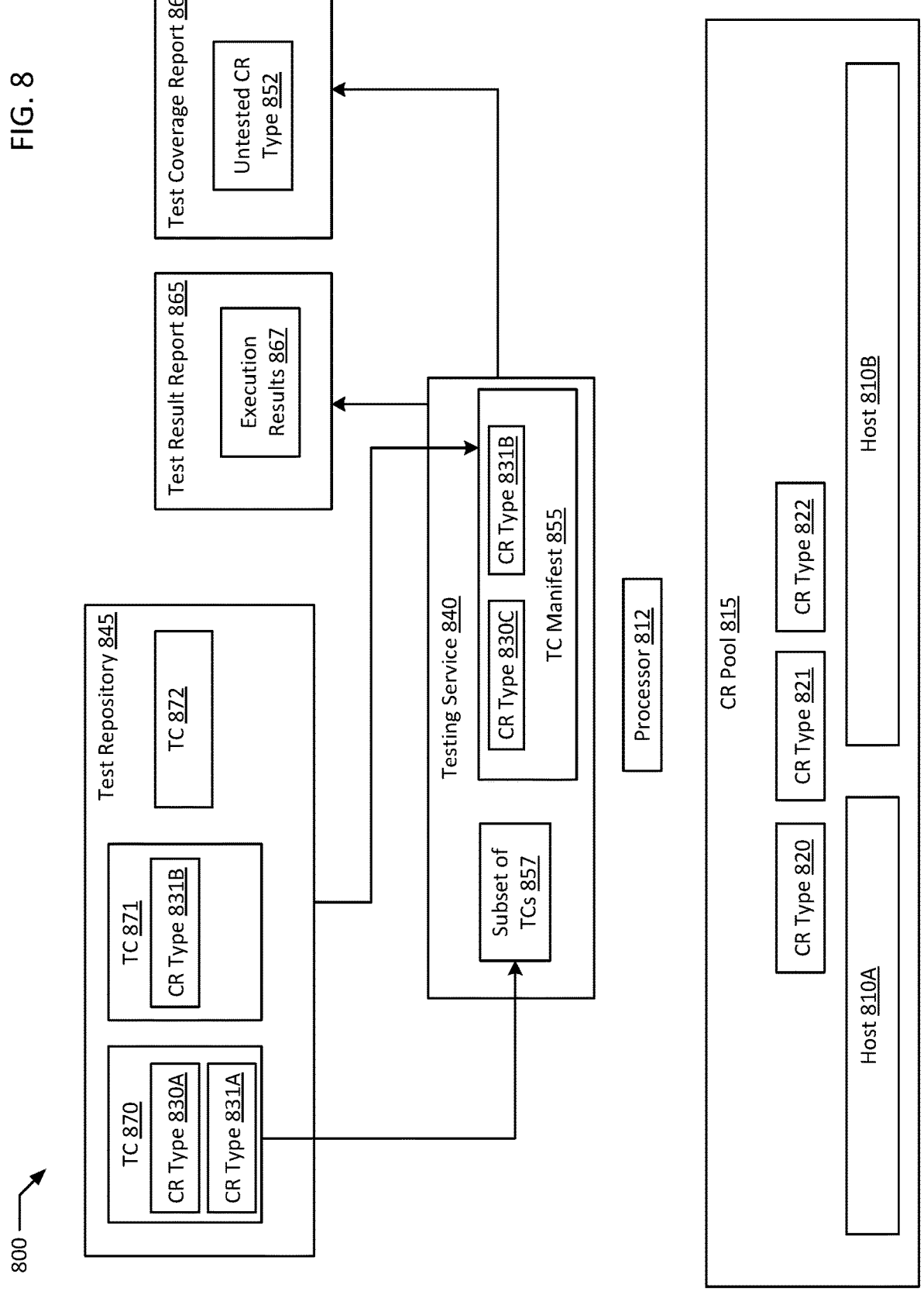

COMPUTING RESOURCE COVERAGE

BACKGROUND

The present disclosure generally relates to developing and executing computer programs in computer systems. For rapid development and deployment of software, developers may often seek to integrate existing code modules and even entire software programs into new software programs and/or jobs executing multiple programs. A job may be configured to take the output of one program and feed that output into a second program as an input into the second program. In addition, for scalability and efficiency reasons, many computer systems employ virtualized guests such as virtual machines and containers to execute computing tasks performed by the computing systems, such as for hosting applications. Typically, guests such as containers and virtual machines may be launched to provide extra compute capacity, while isolating compute resources used by different users and tenants away from those of other users. Employing guests enables rapid scaling of applications to the volume of traffic requesting the services provided by those applications. In addition, guests typically allow for increased deployment flexibility since guests may typically be deployed in a variety of hardware environments. Multiple guests may also be clustered together to perform more complex functions than the respective guests are capable of performing individually. Guests require computing resources to be instantiated. Therefore, ensuring that computing resource allocation in a shared environment operates with minimal errors or interruptions aids in ensuring that processing services provided by guests are not delayed or interrupted.

SUMMARY

The present disclosure provides a new and innovative system, methods and apparatus for computer resource coverage. In an example, a computing resource (CR) pool includes a plurality of CR types hosted on a plurality of hosts, where the plurality of CR types are routinely updated. A test repository stores a plurality of test cases (TC). A processor is configured to execute a testing service to compile, from a plurality of test daemons, a CR manifest of the CR types included in the CR pool. A TC manifest is compiled, including CR types tested by the plurality of TCs. The CR types included in the CR manifest are compared with the CR types included in the TC manifest. A test coverage report of tested and untested CR types is generated. A TC is added to the test repository based on the test coverage report.

Additional features and advantages of the disclosed method and apparatus are described in, and will be apparent from, the following Detailed Description and the Figures.

BRIEF DESCRIPTION OF THE FIGURES

FIGS. 2A-C are block diagrams of generating a computing resource manifest, a test case manifest, and a test coverage report according to an example of the present disclosure.

FIG. 8 is a block diagram of an automated test case execution system according to an example of the present disclosure.

DETAILED DESCRIPTION OF EXAMPLE EMBODIMENTS

Figure 1:
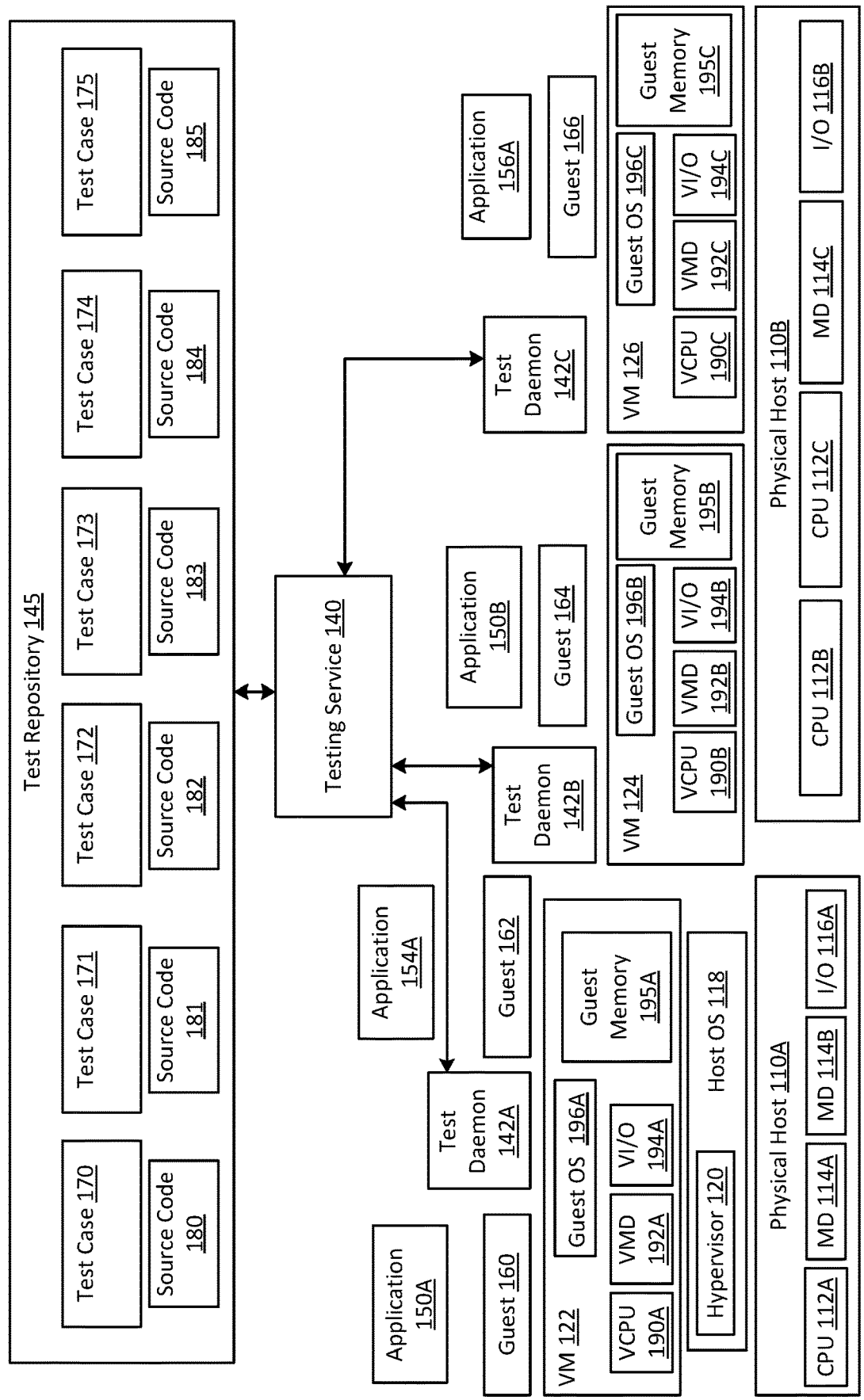
FIG. 1 is a block diagram of a computing resource coverage system according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. Software applications developed in a variety of programming languages are executed on physical hosts or virtual hosts (e.g., VMs and containers). Instead of redeveloping functionality of existing software programs, programmers typically seek to integrate new programs with these existing programs to utilize the features of the existing programs, for example, by incorporating code from a source code repository into a new program or service. There are typically advantages to streamlining and shortening the software development lifecycle ("SDLC"), which results in shortening the time between code being written and updates being deployed to consumers. Some commonly implemented shortened SDLCs include the "Continuous Integration", "Continuous Delivery", and "Continuous Deployment" models of software development. In Continuous Integration, changes are typically merged into an application project's main code base as often as possible (e.g., after completing work on each module). These changes are then built into an executable program that is run against a standard test suite, typically a set of automated tests specific to the application. Each change is therefore incremental and multiple developers may work on the same codebase with assurance that their incremental changes will work with those of their colleagues before a final release is pushed to consumers. In Continuous Delivery, Continuous Integration is further supplemented to allow code that has been successfully validated by automated testing to be released on demand. Typically this may be achieved through automating the release process. With Continuous Delivery, each release is typically small so the universe of code to debug if there is a problem is typically limited, allowing for agile updates. In Continuous Deployment, code changes that pass through automated testing are automatically released as updates, typically providing the fastest updates to users and the fastest feedback from users for new features. Continuous Integration, Continuous Delivery, and/or Continuous Deployment environments may be referred to as CICD environments.

Typically, CICD environments may be advantageously implemented in cloud computing environments where computing resources may be flexibly allocated to guests on demand from a computing resource pool that abstracts the underlying hardware, allowing computing power to be treated as a commoditized resource. However, cloud management software and interfaces are often actively developed, and the definitions regarding what constitutes an allocable and/or trackable resource are often updated during new releases of such cloud management software. Because CICD environments typically treat the allocation of computing resources as a testable execution step that needs to be tested before a new release is propagated, test cases for the types of resource allocations required by a certain program need to be kept up to date with changes to cloud management software to ensure that the tests being performed are valid. Changing definitions present a challenge not only to ensuring that test cases are valid, but also to ensuring that the allocation of resources required by a certain processing task are tested. These challenges typically result in gaps in resource allocation testing, which in turn often results in unpredicted and unhandled errors in released code, as many computer programs are developed under the assumption that there will be sufficient computing resources available on demand to execute the programs. These failures become especially costly in wasted computing overhead when they require many computing tasks to be reprocessed in order to return to the execution state of the failure. For example, one program's outputs may be fed into another program as inputs in a series of processing tasks configured to be executed as a job. A failure of a job hours into execution based on failure to allocate resources to initialize one of the processing tasks (e.g., in a new container) may result in hours of wasted computing cycles.

Systems and methods described in the present disclosure allow for the discovery of gaps in resource allocation testing, whether due to management system updates or due to mislabeling. In addition, an effective and efficient set of test cases to execute may be identified and automatically executed to provide improved resource allocation test coverage for a given set of test cases, while minimizing wasted computing power executing redundant test cases. A testing service may be implemented that discovers the currently valid computing resource types in a hosting environment, for example, a computing resource pool such as a multi-tenant cloud. In the example, the testing service may analyze a deployed version of a computing resource management service of the hosting environment (e.g., Red Hat® Openstack® Platform, Red Hat® CloudForms®, etc.). In addition, the testing service may receive input on computing resources available for allocation from testing daemons deployed throughout the environment at various endpoints connected to the environment, for example, guests hosted in the environment and workstations, laptops, phones, tablets, and other devices connected to the environment utilizing the environment to process computing tasks on such guests. For example, a test daemon may execute on such endpoints to provide feedback regarding the computing resource types that the environment allows, and also to execute the test cases stored in a test case repository for testing computing resource allocation. The testing service may also be configured to detect mislabeled tests, for example, by parsing the source code of a test case to determine whether the test case is invoking appropriate application programming interfaces (APIs) for testing the allocation of the computing resource types the test is labeled for. Automating the testing of computing resource allocation allows for significantly reduced software development and deployment timelines while reducing wasted computing resources executing unnecessary or invalid test cases.

FIG. 1 is a block diagram of a computing resource coverage system according to an example of the present disclosure. The system 100 may include one or more physical host(s) 110A-B. Physical hosts 110A-B may in turn include one or more physical processor(s) (e.g., CPUs 112A-C) communicatively coupled to memory device(s) (e.g., MD 114A-C) and input/output device(s) (e.g., I/O 116A-B). As used herein, physical processor or processors 112A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-C refer to volatile or non-volatile memory devices, such as RAM, ROM, EEPROM, or any other device capable of storing data. In an example, memory devices 114A-C may be persistent storage devices such as hard drive disks ("HDD"), solid state drives ("SSD"), and/or persistent memory (e.g., Non-Volatile Dual In-line Memory Module ("NVDIMM")). Memory devices 114A-C may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A-B refer to devices capable of providing an interface between one or more processor pins and an external device, the operation of which is based on the processor inputting and/or outputting binary data. CPU(s) 112A-C may be interconnected using a variety of techniques, ranging from a point-to-point processor interconnect, to a system area network, such as an Ethernet-based network. Local connections within physical hosts 110A-B, including the connections between processors 112A-C and memory devices 114A-C and between processors 112A-C and I/O device 116A-B may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers), for example, guests 160 and 162. In an example, a container (e.g., guest 160 or 162) may be a guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110A. In an example, guest 160 and/or guest 162 may be VMs or containers executing on VM 122. In an example, guest 160 may execute application 150A. In an example, application 150A may additionally include executing with one or more layers of additional virtualization. For example, application 150A may execute inside of another guest. In an example, application 150A may be programmed in an interpreted language executing in a specific runtime environment with some of the features of a full fledged virtual guest (e.g., Java Runtime Environment®). In an example, guest 162 also executing on VM 122 may execute application 154A, which may perform a related processing task to application 150A. In an example, application 154A may perform a completely unrelated processing task to application 150A.

System 100 may run one or more guests (e.g., VM 122 guests 160, 162), by executing a software layer (e.g., hypervisor 120) above the hardware and below the VM 122, as schematically shown in FIG. 1. In an example, the hypervisor 120 may be a component of respective host operating system 118 executing on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OS 118 without an intervening layer of virtualization. In an example, VM 122 may be a virtual machine and may execute a guest operating system 196A which may utilize the underlying VCPU 190A, VMD 192A, and VI/O 194A. Processor virtualization may be implemented by the hypervisor 120 scheduling time slots on physical processors 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A. In an example, guest OS 196A application 150A, which may be implemented with any suitable form of executable code (e.g., application, program, script, etc.) to provide a specific processing capability. In an example, application 150A may execute directly on guest OS 196A, or application 150A may be further virtualized, for example, in a container or secondary virtual machine.

In an example, VMs 124 and 126 may be similar virtualization implementations to VM 122, but may, for example, execute separate operating systems (e.g., guest OS 196B-C). In an example, guest OSes 196B/C may be incompatible with guest OS 196A and/or host OS 118. In an example, guests 124 and 126 execute on physical host 110B, with VCPU 190B-C, VMD 192B-C, VI/O 194B-C, and guest memory 195B-C virtualizing access to physical CPU 112B-C, MD 114C, and I/O 116B. In an example, VMs 124 and 126 may host guests 164 and 166 respectively, with guest 164 hosting application 150B (e.g., another copy of application 150A), and guest 166 hosting application 156A.

In an example, a guest virtualization orchestrator (e.g., Red Hat® OpenShift®, Kubernetes®) manages the scheduling and deployment of virtual compute resources for system 100. In an example, testing service 140 may be integrated with the guest virtualization orchestrator to test computing resource allocation. In the example, a test repository 145 stores a plurality of test cases (e.g., test cases 170-175), which may be stored in executable form, and also source code files 180-185 respectively associated with test cases 170-175. In an example, test cases 170-175 may be executed against physical hosts 110A and 110B to determine whether computing resources provided by physical hosts 110A-B may be allocated to virtual guests in a manner required by processing tasks (e.g., applications 150A/B, 154A, 156A).

In an example, any form of suitable network for enabling communications between computing devices of system 100 (e.g., physical hosts 110A-B, VMs 122, 124, and 126, guests 160, 162, 164, and 166). For example, a public network (e.g., the Internet), a private network (e.g., a local area network (LAN) or wide area network (WAN)), or a combination thereof may be employed to connect the component parts of the system (e.g., physical hosts 110A and 110B and their respective guests) to each other. In an example, the various software components of system 100 (e.g., VMs 122, 124, and 126, guests 160, 162, 164, 166, applications 150A-B, 154A, 156A, testing service 140, test repository 145, etc.) may be implemented via any suitable form of computing module (e.g., application, executable, script, hardware module, etc.). Test daemons 142A, 142B, and 142C are deployed respectively to VMs 122, 124, and 126 to probe the resources and resource types available for allocation on VMs 122, 124, and 126. In an example, test daemons 142A-C are also configured to execute test cases on their respective VMs. In an example, test daemons 142A-C may be implemented via any suitable form of computing module (e.g., application, executable, script, hardware module, etc.).

In an example, test repository 145 may be any form of suitable storage system for storing data and/or metadata appropriate to each respective storage, for example a relational database. The test repository 145 may be stored in a database associated with a database management system ("DBMS"). A DBMS is a software application that facilitates interaction between the database and other components of the system 200. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, a relational database may be implemented with add-on packages and/or services for additional functionality and security (e.g., Red Hat Database®). In an example, test repository 145 may be stored in a database organized as a formal database with a schema such as a relational schema with defined tables, indices, links, triggers, various commands etc. In some examples, test repository 145 may not be organized as a formal database, but may instead be an alternative storage structure capable of holding the information stored in test repository 145, including but not limited to a file, folder, directory, registry, array, list, etc. In an example, test repository 145 may be separated into separate repositories (e.g., different sources for tests) and the source code and executable code for a given test case may also be stored on separate repositories.

Figure 2A:
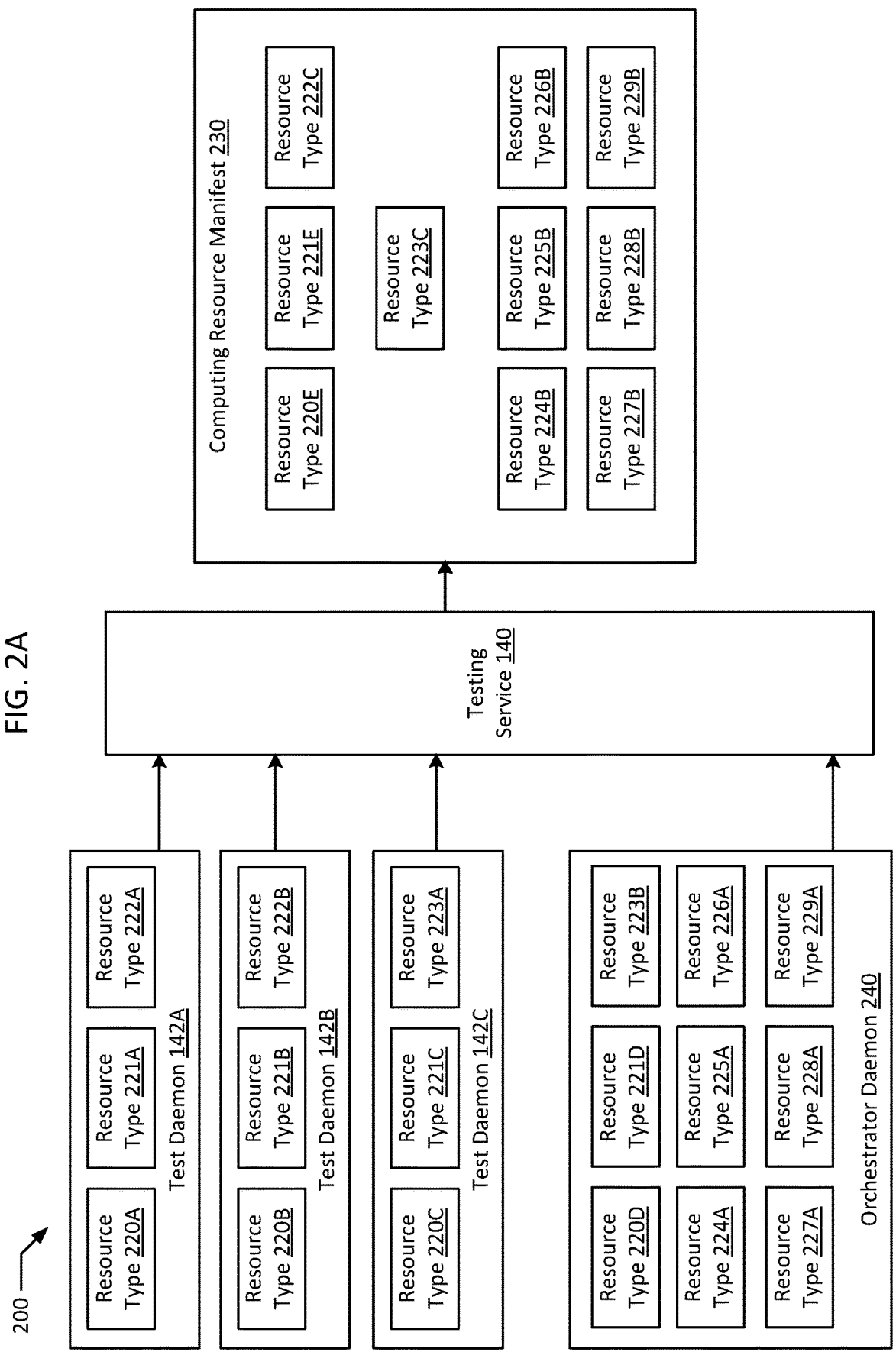
Figure 2B:
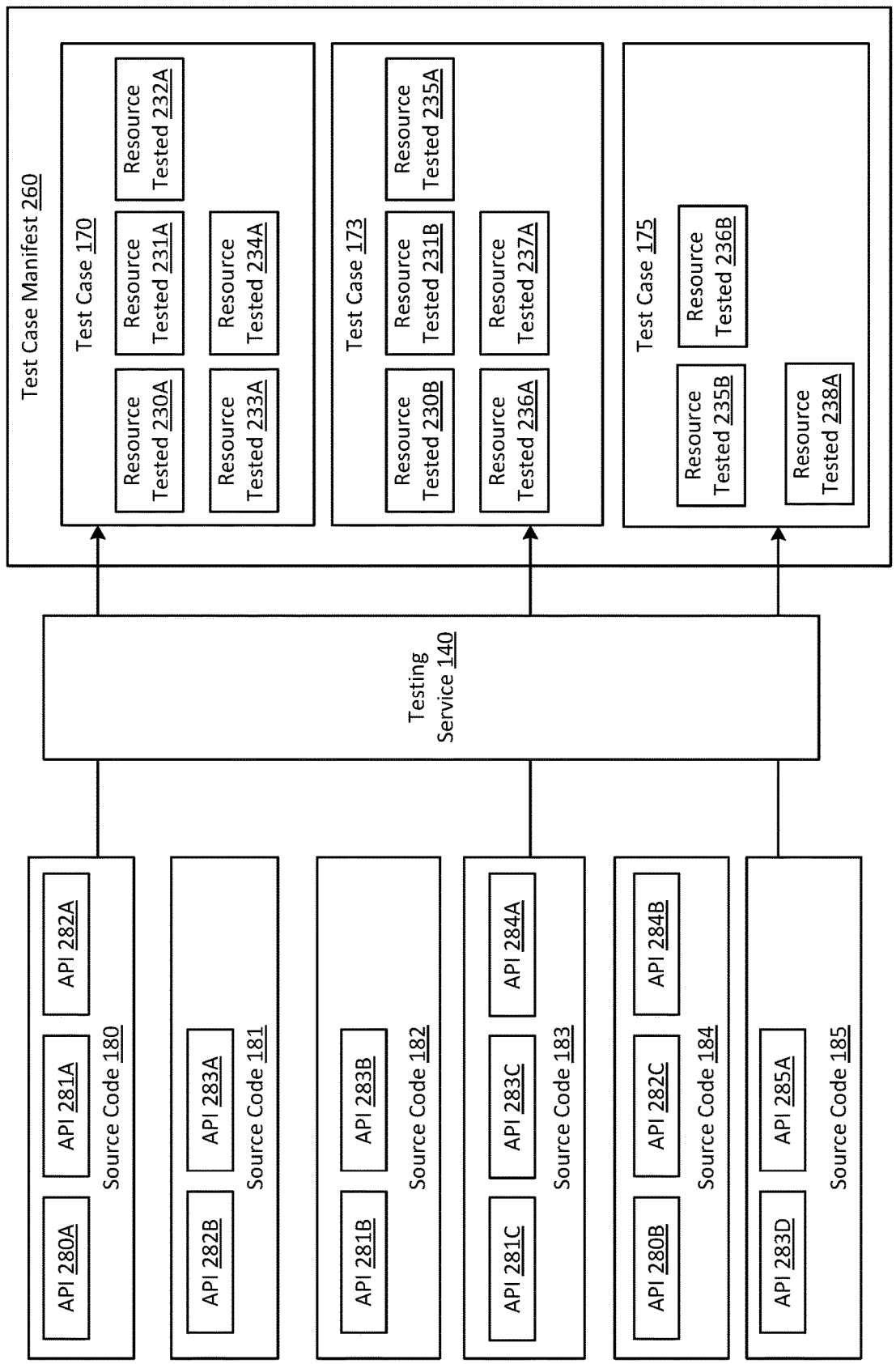

FIGS. 2A-C are block diagrams of generating a computing resource manifest, a test case manifest, and a test coverage report according to an example of the present disclosure. In example system 200 illustrated in FIG. 2A, testing service 140 generates computing resource manifest 230 based on data collected by test daemons 142A-C as well as an orchestrator daemon 240 executing on the virtualization orchestrator of system 100. In an example, each of test daemons 142A-C probes their respective host VM 122, 124, and 126 to determine the resource types that may be requested for allocation directly at the VM level. For example, test daemon 142A determines that resource types 220A, 221A, and 222A are available on VM 122. In the example, test daemon 142B determines that the same resource types are available on VM 124 (e.g., resource types 220B, 221B, and 222B). In the example, test daemon 142C determines that VM 126 allows for the allocation of resource types 220C and 221C corresponding with 220A/B and 221A/B, but also for resource type 223A that is not available on VMs 122 and 124. For example, guest OS 196A and 196B may be the same type of OS, but guest OS 196C may be a different, incompatible OS that has different computing resource classifications. For example, modifying inodes would be a feature of allocating storage on Red Hat® Enterprise Linux® that is absent from Microsoft® Windows® due to differences in storage architecture. In an example, orchestrator daemon 240 executing on the guest orchestrator (e.g., Red Hat® OpenShift®, Kubernetes®, etc.) may be exposed to additional resource types that are not accessible on the VM or endpoint level. In the example, orchestrator daemon 240 discovers resource types 220D, 221D, and 223B that correspond to resource types discovered by test daemons 142A-C, but additionally discovers resource types 224A, 225A, 226A, 227A, 228A, and 229A. In an example, the additional resource types may be associated with resources pooled together from multiple hosts and therefore unavailable to an individual host (e.g., distributed storage, network load balancing, etc.). In an example, testing service 140 combines the inputs from the various daemons to generate a computing resource manifest 230 that includes all of the unique identified allocable resource types in system 100 (e.g., resource types 220E, 221E, 222C, 223C, 224B, 225B, 226B, 227B, 228B, 228B). In addition, testing service 140 may discover, directly or through a testing/orchestrator daemon, the current version of cloud management software being implemented in system 100 and infer the allocable resource types from a manual or resource definition file for the cloud management software. However, typically, at least some resource types allowed by the software will not be allocable due to administrative restrictions placed on the environment.

Example system 201 illustrated in FIG. 2B depicts testing service 140 generating a test case manifest 260 of test cases in test repository 145 that may be executed to verify the types of computing resources identified in computing resource manifest 230. In an example, test case manifest 260 may include all test cases in test repository 145. However, a more optimized test case manifest 260 may be curated to identify a subset of the tests in test case repository 145 that, in combination, covers a maximum count of resource types tested while executing a minimal amount of test cases. In an example, test repository 145 may additionally store execution metrics associated with test cases 170-175. In such examples, rather than selecting based on a minimal count of test cases executed, other selection criteria may be implemented. For example, if executing test cases 171, 172, 174, and 175 is typically faster than executing test cases 170, 173, and 175, then executing four test cases may be more optimal than three test cases where test execution speed is a factor that testing service 140 is configured to utilize in selecting test cases. In an example, test repository 145 may often be integrated with a publicly accessible code repository (e.g., github), and certain test cases may be excluded from a test manifest based on ratings received by the test case. For example, low ratings may be indicative of a defective or obsolete test case. In an example, these test cases may be identified based on metadata associated with respective test cases 170-175 identifying the resource types tested by each individual test. In addition, testing service 140 may also retrieve the source code files (e.g., source code 180-185) of the test cases to verify the resource types tested by each test case. For example, computing resources are typically accessed through APIs. Therefore, a test case for a specific resource type (e.g., CPU, memory, network, etc.) will typically need to implement the appropriate APIs with the appropriate settings associated with that resource type. Therefore API calls made by a specific test case as identified through that test case's source code may identify whether the specific test case actually accesses the resource types it is purportedly designed to test. In some cases, even if the test case actually indirectly tests a resource type without invoking the typically associated API, that test case may be considered invalid for testing that resource type if the application code that will execute on the environment does use the typically associated API. In an example, source code 180 invokes APIs 280A, 281A, and 282A. Source code 181 invokes APIs 282B (e.g., same as 282A), and 283A. Source code 182 invokes API 281B and 283B (e.g., additional copies of API 281A and 283A). Source code 183 invokes API 281C, 283C, and 284A. Source code 184 invokes API 280B, 282C, and 284B. Source code 185 invokes API 283D and 285A. Therefore, in total the set of test cases 170-175 invoke six different APIs, 280A-285A. A set of three test cases 170, 173, and 175 is then identified as corresponding to source code 180, 183, and 185. This set of test cases covers all six of the different invoked APIs. Testing service 140 then maps the different APIs to the different resource types associated with each API, determining that API 280A corresponds to resources tested 230A and 231A; APIs 281A and 281C correspond to resources tested 232A, 232B, 233A, and 233B; API 282A corresponds to resource tested 234A; API 283C and 283D correspond to resources tested 235A, 235B, 236A, and 236B; API 284A corresponds to resources tested 237A; and API 285A corresponds to resource tested 238A.

Example system 202 illustrated in FIG. 2C depicts a later state of system 200 and 201, in which the test case manifest 260 and computing resource manifest 230 previously generated by testing service 140 are compared against each other to generate test coverage report 250. In the illustrated example, test case manifest 260 indicates that nine different resource types are tested (e.g., 230A-238A), while computing resource manifest 230 indicates that there are ten identified allocable resource types 220E, 221E, 222C, 223C, 224B, 225B, 226B, 227B, 228B, and 229B. Based on these inputs, testing service 140 generates test coverage report 250, which indicates that nine types of resources are tested (e.g., tested resource types 290-298) after executing test cases 170, 173, and 175, with one resource type untested (e.g., untested resource type 299. In the example, resource tested 230A corresponds to resource type 220E and tested resource type 290; resource tested 231A corresponds to resource type 221E and tested resource type 291; resource tested 232A corresponds to resource type 222C and tested resource type 292; resource tested 233A corresponds to resource type 223C and tested resource type 293; resource tested 234A corresponds to resource type 224B and tested resource type 294; tested 235A corresponds to resource type 225B and tested resource type 295; tested 236A corresponds to resource type 226B and tested resource type 296; tested 237A corresponds to resource type 227B and tested resource type 297; tested 238A corresponds to resource type 228B and tested resource type 298; and resource type 229B corresponds to untested resource type 299.

In a typical example, as with Red Hat® OpenStack®, there may be hundreds, even thousands of defined resource types which may further be divided into sub resource types, while a typical test case repository may store upwards of a few thousand test cases. In such environments, a typical test coverage report may well include many untested resource types, even hundreds of untested resource types. For example, a current version of OpenStack® includes one hundred and thirty-eight categories of resource types, associated with resources derived from the basic resource types of CPU, memory, storage, networking, and GPU. For example, storage may include different levels of performance (e.g., persistent memory, SSD, HDD), types of replication (e.g., RAID 0, 1, 5, 6), I/O throughput etc. CPU may include speed and cores, along with specifications on types and speed of caches and specialized hardware (e.g., hardware virtualization support). Networking may include security settings (e.g., firewall, encryption), as well as throughput settings (e.g., latency and bandwidth), along with other restricted resources such as allocated ports. Between various releases of cloud management software, different categories may be combined or divided and new resource types may be addressed. For example, certain types of resources may be closely associated with each other such that managing them separately may in most cases be a waste of management overhead (e.g., managing inodes separately from storage capacity). However, managing inodes separately from capacity may be important in systems storing many small files since the available inodes may be exhausted before the storage capacity associated with the inodes, which may result in under provisioning. In such an example, a test case that tests storage allocation may become insufficient for resource coverage testing if inodes become separately allocable from storage capacity. In an example, a test coverage report may be broken down by classes of resource types, as different applications are more sensitive to different resource needs. For example, a tenant in a cloud executing applications that don't maintain persistent states may not be worried about storage allocation, and may be inclined to ignore gaps in storage allocation coverage. A test coverage report may also include no untested resource types if every resource type is covered by an available test case.

Figure 3:
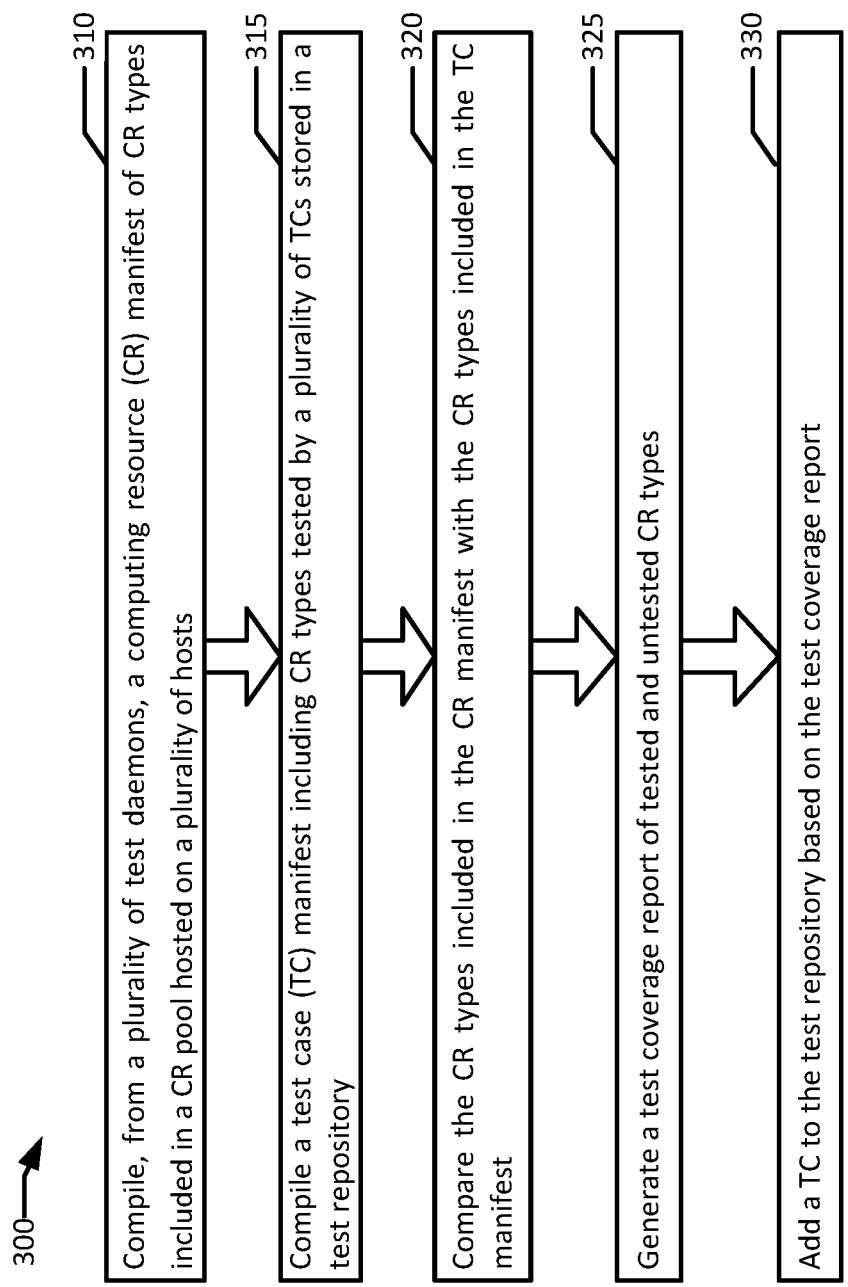
FIG. 3 is flowchart illustrating an example of generating a test coverage report according to an example of the present disclosure.

FIG. 3 is flowchart illustrating an example of generating a test coverage report according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by testing service 140.

Example method 300 may begin with compiling, from a plurality of test daemons, a computing resource (CR) manifest of CR types included in a CR pool hosted on a plurality of hosts (block 310). In an example, a plurality of CR types included in the CR pool is routinely updated (e.g., up to multiple times in a month). In an example, a computing resource type is a networking resource, a memory resource, a storage resource, a processor resource, and/or a graphical processor resource. For example, networking resources may include IPs, subnets, routers, hubs, switches, ports, etc. Memory resources may include DRAM, persistent memory, hard drives, solid state drives, and storage nodes, including both distributed storage (e.g., Red Hat Ceph®), or dedicated storage (e.g., NAS or SAN implementations) etc. Processor resources, both CPU and GPU, may include cores, threads, caches, etc. In an example, test daemons (e.g., test daemons 142A-C) are deployed to system 100 to collect information on CR types available for allocation in system 100. In an example, test daemons are additionally deployed to endpoints connected to system 100 over a network (e.g., the internet). For example, a test daemon may be included in a client used to access applications in a cloud hosted computing resource pool, where the client executes on some form of network connected device (e.g., workstation, laptop, phone, tablent, Internet-of-things device).

In an example, the classification of CR types is updated based on updates to a CR pool management system of the CR pool. In an example, an administrator of the CR pool may also change the definitions of allocable CR types. In an example, testing service 140 is configured to regenerate the CR manifest and any test coverage reports based on the CR manifest when such updates to defined CR types occur. In an example, updating the plurality of CR types includes at least one of adding a new CR type and removing an existing CR type. In an example, a plurality of existing CR types are combined into the new CR type. For example, separately allocable resource types of storage capacity and inodes addressing the storage capacity may be combined into a single storage resource type. Similarly, CRs represented by an existing CR type are recategorized as a plurality of new CR types. For example, the reverse of the scenario above may be implemented splitting up the allocation of storage capacity from the allocation of inodes.

A test case (TC) manifest including CR types tested by a plurality of TCs stored in a test repository is compiled (block 315). In an example, testing service 140 determines the CR types tested by each TC (e.g., test cases 170-175) stored in test repository 145. In an example, testing service 140 may retrieve metadata associated with each of test cases 170-175 that includes descriptions of the CR types tested by each of test cases 170-175. In an example, testing service 140 may parse a source code of a TC to determine a list of application programming interface (API) calls invoked by the TC. For example, source code 180 of test case 170 may include API calls to APIs 280A, 281A, and 282A, which may then be identified as being associated with resource types 220A-224A. In an example, the CR types tested by a given TC are identified by comparing the list of API calls invoked by the TC to a master list mapping associations between CR types and API calls. In an example, the master list may be indexed and configured to utilize a hash based lookup to allow the lookups to be performed more efficiently. In an example, automatic associations may be overridden by manual inputs. For example, automatic detection may discover an API call and associate a test case as testing the relevant CR types associated with the API call, but an inspection of the code may indicate that the API call's results are not used in the testing or reporting routines in the test case. In such cases, executing such an API call may not provide any functional testing of resource allocation in the environment, so CR types associated with such API calls should not be added to the tested CR types tested by the TC in question. A test case may also be mislabeled or obsolete. For example, a test case identified via metadata as testing networking resource allocations may, upon having its source code parsed by testing service 140, be identified as an invalid test. For example, testing service 140 may identify that the test case lacks API calls expected to be invoked for testing the identified networking resource types. For example, a deprecated API may be invoked instead of a current one, or the test may have been checked into the repository without all of its designed functionality being implemented. In such examples, testing service 140 may be configured to generate an alert to an administrator based on the lack of the API call, and testing service 140 may remove any misidentified CR types from a test case manifest (e.g., test case manifest 260) that includes the defective test case. In an example, testing service 140 identifies a subset of test cases in test repository 145 (e.g., test cases 170, 173, 175) that in combination tests each of the CR types represented in the TC manifest. In making such an identification, other test cases providing redundant testing of those CR types may be identified as being inefficient to run due to providing only redundant information. However, in some cases, testing service 140 may configured to identify test cases providing a configured amount of redundant testing (e.g., each CR type needs to be tested by at least two different tests).

The CR types included in the CR manifest are compared with the CR types included in the TC manifest (block 320). In an example, the CR types included in computing resource manifest 230 (e.g., resource types 220E, 221E, 222C, 223C, 224B, 225B, 226B, 227B, 228B, 229B) are compared against the CR types included in test case manifest 260 (e.g., resource tested 230A-238A). In an example, the many to many comparison between CR types in computing resource manifest 230 to the CR types in test case manifest 260 may be optimized in any suitable manner. For example, translation may be performed to the CR type list from computing resource manifest 230 and/or test case manifest 260 to ensure that the same CR type definitions are used in each list. In addition, sorting, indexing, and/or hashing may be performed on the lists to allow the lists to be compared more efficiently. A test coverage report of tested and untested CR types is generated (block 325). In an example, test coverage report 250 is generated identifying both tested resource types (e.g., tested resource types 290-298) as well as untested resource types (e.g., untested resource type 299). For example, test coverage report 250 identifies that 9 out of 10 resource types are tested, or a computing resource coverage of 90% based on the tests in test repository 145. In an example, test coverage report 250 is output in a visual form (e.g., through a graphical user interface). In an example, test coverage report 250 may additionally be configured to generate a table or graph illustrating the test case coverage of the computing resources allocable in system 100.

A TC is added to the test repository based on the test coverage report (block 330). In an example, based on discovering that at least one untested resource type (e.g., untested resource type 299) exists in test coverage report 250, a test case testing resource type 229B is identified and added to test repository 145 to be executed to test resource type 229B. For example, testing service 140 may be configured to retrieve candidate test cases from public code repositories (e.g., github) flagged with resource type 229B. In an example, testing service 140 is configured to execute each test case identified in test case manifest 260 (e.g., test cases 170, 173, and 175). In an example, the newly added test case is also executed. In an example, testing service 140 executes the test cases directly. In an example, at least some test cases are passed to various testing daemons to be executed remotely. In an example, testing service 140 reports the results of executed test cases, either in conjunction with its test coverage report 250 or in a separate report.

Figure 4:
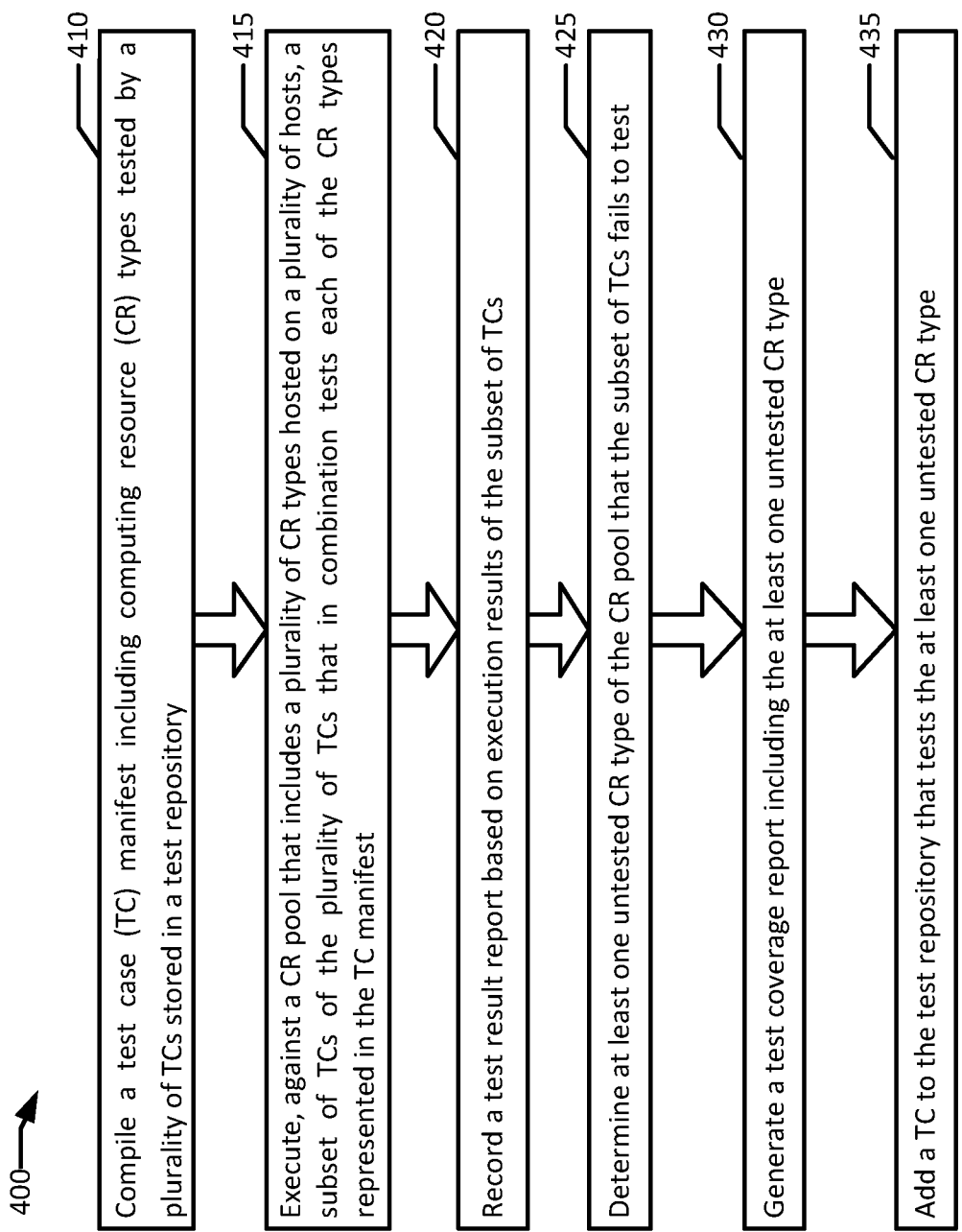
FIG. 4 is flowchart illustrating an example of automated test case execution according to an example of the present disclosure.

FIG. 4 is flowchart illustrating an example of automated test case execution according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by testing service 140.

Example method 400 may begin with compiling a test case (TC) manifest including computing resource (CR) types tested by a plurality of TCs stored in a test repository (block 410). In an example, a plurality of CR types included in the CR pool is routinely updated. In an example, a computing resource type is a networking resource, a memory resource, a storage resource, a processor resource, and/or a graphical processor resource. For example, networking resources may include IPs, subnets, routers, hubs, switches, ports, etc. Memory resources may include DRAM, persistent memory, hard drives, solid state drives, and storage nodes, including both distributed storage (e.g., Red Hat Ceph®), or dedicated storage (e.g., NAS or SAN implementations) etc. Processor resources, both CPU and GPU, may include cores, threads, caches, etc. In an example, test daemons (e.g., test daemons 142A-C) are deployed to system 100 to collect information on CR types available for allocation in system 100. In an example, compiling the TC manifest includes determining respective CR types tested by each TC (e.g., test cases 170-175) in the plurality of TCs (e.g., test cases stored in test repository 145). In an example, each test case 170-175 is associated with metadata that identifies the CR types tested by the test cases. In an example, these CR types are validated by the testing service 140 by parsing the source code 180-185 associated with test cases 170-175. In the example, the test cases are validated as invoking API calls associated with the various CR types the test cases are purported to test based on their associated metadata identifiers. In an example, the metadata is updated by the testing service 140 based on results from parsing the source code projects. For example, if a test case lacks an API call associated with a CR type listed as being tested, an alert may be generated flagging the information as erroneous, and any test case manifest including the test case may be revised based on the validation of CR types being tested.

A subset of TCs of the plurality of TCs that in combination tests each of the CR types represented in the TC manifest is executed against a CR pool that includes a plurality of CR types hosted on a plurality of hosts (block 415). In an example, the plurality of CR types are routinely updated. In an example, the plurality of CR types is updated based on an update to a CR pool management system of the CR pool. In such examples, especially in CICD environments, it is often crucial for test cases to be re-executed to ensure that the updates to the CR pool management system do not affect any routinely executed processing tasks or jobs.

Testing service 140 may be configured to detect such updates based on changes to allocable CR types identified by test daemons (e.g., test daemons 142A-C, orchestrator daemon 240) deployed in the environment. In an example, testing service 140 regenerates test coverage report 250 each time the CR pool management system is updated or each time a change is detected to the allocable computing resources in the system. In various examples, test cases 170, 173, and 175 may be executed directly by testing service 140 (e.g., through commands to a guest deployment orchestrator), or via the various test daemons deployed in system 100. For example, resource types 220A, 221A, and 222A are accessible to test daemon 142A, and so test case 170 which tests these resource types may be executed by test daemon 142A to verify that allocation of these resource types is functioning as expected. In an example, execution of the same test case from different locations (e.g., test daemon 142A vs testing service 140) may yield different results, for example, due to permissioning differences between the various actors. Therefore executing the same test from different locations in a system may aid in determining whether the system is configured properly for all of the resource allocation requests expected to be generated while executing processing tasks in the system.

A test result report based on execution results of the subset of TCs is recorded (block 420). In an example, the test results from executing the selected subset of test cases (e.g., test cases 170, 173, and 175) is recorded. In some examples, multiple test daemons may execute the same test cases to perform validation with different permissioning levels. At least one untested CR type of the CR pool that the subset of TCs fails to test is determined (block 425). For example, untested resource type 299 (e.g., resource type 229B) is identified based on comparing the tested resource types identified in test case manifest 260, or the test results from executing test cases 170, 173, and 175 to a computing resource manifest 230 generated based on the allocable resource types identified in system 100. In some examples, test results may be limited, as many programmed test cases are configured to only generate results on failure. Therefore a lack of any report may in those cases be inferred as a successful test execution. However, those tests are especially prone to becoming antiquated and obsolete due to system wide updates, for example, to API calls because there may be no indication that the test case is no longer doing what it was designed to do by executing the test case. Therefore code base verification performed by testing service 140 may be crucial in ensuring that proper testing is actually being performed.

A test coverage report including the at least one untested CR type is generated (block 430). In an example, test coverage report 250 generated by testing service 140 includes test results from executing the subset of TCs, and the test coverage report is outputted in visual form. A TC is added to the test repository that tests the at least one untested CR type (block 435). In an example, based on discovering that at least one untested resource type (e.g., untested resource type 299) exists in test coverage report 250, a test case testing resource type 229B is identified and added to test repository 145 to be executed to test resource type 229B. For example, testing service 140 may be configured to retrieve candidate test cases from public code repositories (e.g., github) flagged with resource type 229B. In an example, a new custom test case is developed to test the identified untested resource type and added to test repository 145.

Figure 5:
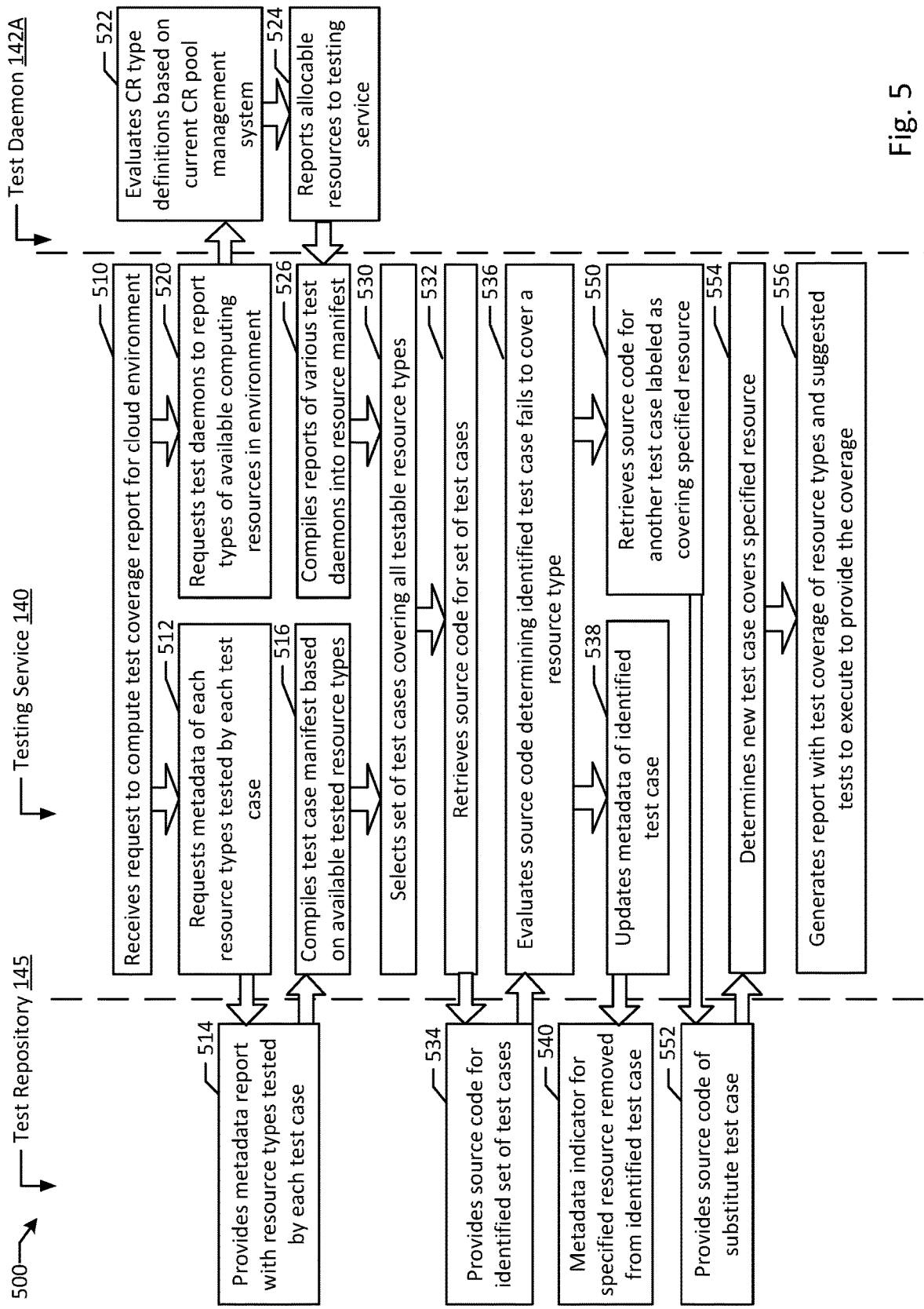
FIG. 5 is a flow diagram of an example of a test coverage report generation and test case validation according to an example of the present disclosure.

FIG. 5 is a flow diagram of an example of a test coverage report generation and test case validation according to an example of the present disclosure. Although the examples below are described with reference to the flow diagram illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, testing service 140 generates a test coverage report of test cases in test repository 145 against a computing resource pool instrumented with test daemons including test daemon 142A.

In example system 500 illustrated in FIG. 5, testing service 140 receives a request to compute a test coverage report for a cloud hosting environment (e.g., a computing resource pool deployed on physical hosts 110A-B) (block 510). In an example, testing service 140 requests metadata associated with each test case stored in test repository 145 to identify the resource types tested by each test case (block 512). In the example, test repository 145 provides a metadata report of each resource type tested by each test case (e.g., test cases 170-175) (block 514). In an example, testing service 140 compiles a test case manifest 260 based on the resources tested by the available test cases (block 516).

Meanwhile, testing service 140 also requests various test daemons (e.g., test daemons 142A-C, orchestrator daemon 240) to report on the resource types available for allocation in the cloud environment (block 520). Test daemon 142A, one of the test daemons asked to report in, evaluates the CR type definitions available in the current version of the CR pool management system deployed on the cloud environment (block 522). Test daemon 142A then reports all of the allocable resource types that may be allocated based on requests by test daemon 142A (e.g., resource types 220A-22A) to testing service 140 (block 524). Testing service 140 receives the report from test daemon 142A, and additional reports from other test daemons (e.g., test daemons 142B-C, orchestrator daemon 240), and combines the report results into computing resource manifest 230 (block 526).

Testing service 140 then selects a subset of test cases covering all of the testable resource types (e.g., test cases 170, 173, and 175) (block 530). In the example, testing service 140 retrieves the source code files 180, 183, and 185 corresponding to test cases 170, 173, and 175 from test repository 145 (block 532). Test repository 145 provides the source code files 180, 183, and 185 for the identified test cases (block 534). Testing service 140 then evaluates source code 180, 183, and 185, and determines that test case 173 actually fails to cover resource type 227A/B (block 536). For example, test case 173 may be identified as implementing API 284A, but the section of code invoking API 284A may not be actually invoked by executing test case 173 due to a coding error or based on being commented out. In an example, testing service 140 updates test case 173's metadata to remove references to testing resource type 227A/B and/or invoking API 284A (block 538). In the example, the metadata indicator for resource type 227A/B is removed from test case 173 in test repository 145 (block 540). Testing service 140 then retrieves the source code for other test cases labeled as covering the specified resource (e.g., test case 174) (block 550). In the example, test repository 145 provides the source code 184 of the substitute test case 174 (block 552). Testing service 140 determines that test case 174 covers the specified resource based on source code 184 implementing API 284B (block 554). Testing service 140 then generates a test coverage report 250 of resource types tested and a list of suggested tests to execute to provide the reported coverage (e.g., test cases 170, 174, and 175) (block 556).

Figure 6:
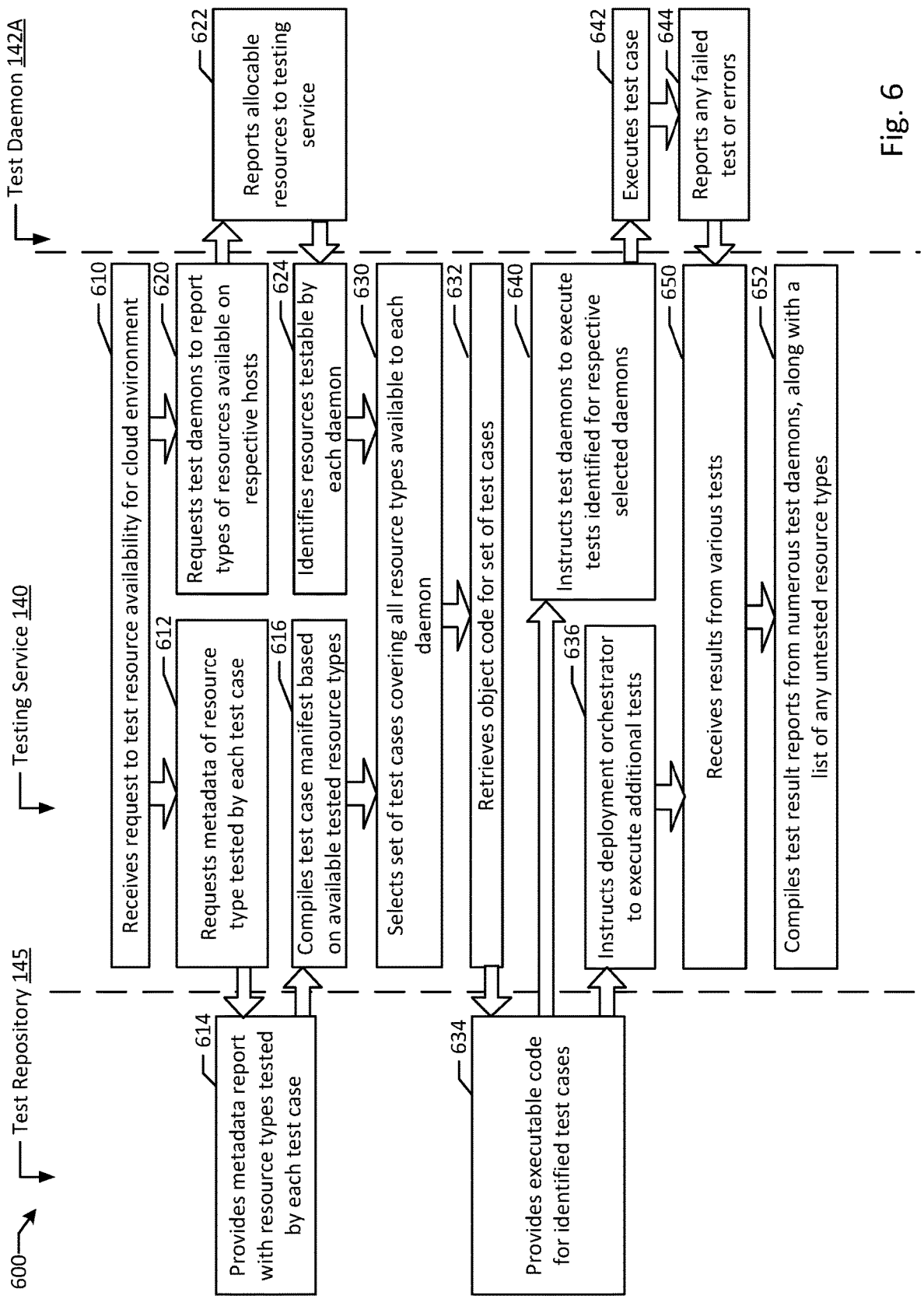
FIG. 6 is a flow diagram of an example of federated automated test case execution according to an example of the present disclosure.

FIG. 6 is a flow diagram of an example of federated automated test case execution according to an example of the present disclosure. Although the examples below are described with reference to the flow diagram illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600 testing service 140 executes test cases stored in test repository 145 through test daemons including test daemon 142A.

In example system 600 illustrated in FIG. 6, testing service 140 receives a request to test resource allocation availability in the cloud environment of system 100 (block 610). In an example, testing service 140 requests the metadata associated with each test case 170-175 in test repository 145 for the resource type tested by each test case (block 612). Test repository 145 provides a metadata report of the resource types tested by each test case (block 614). Testing service 140 then compiles a test case manifest 260 based on the resource types tested by the available test cases (block 616). Concurrently with generating the test case manifest 260, testing service 140 requests its associated test daemons (e.g., test daemons 142A-C and orchestrator daemon 240) to report on the resource types available for allocation on the test daemons respective hosts (e.g., VMs 122, 124, and 126) (block 620). Test daemon 142A reports the resources it is permissioned to allocate to testing service 140 (block 622). Testing service 140 identifies the resources testable by each test daemon based on the reports from the various test daemons including test daemon 142A (block 624). Testing service 140 then selects a set of test cases covering all of the resource types available to each test daemon based on the test cases in test repository 145 (block 630). Testing service 140 retrieves the object code for the identified set of test cases (e.g., test cases 170, 173, and 175) (block 632). Test repository 145 provides the executable code for the identified test cases 170, 173, and 175 to testing service 140 (block 634).

Testing service 140 identifies a set of test cases that need to be executed through a deployment orchestrator for system 100 and instructs the deployment orchestrator to execute those test cases (e.g., test cases 173 and 175) (block 636). Testing service 140 also identifies tests executable by the various test daemons based on the resource types reported by those test daemons, for example, test case 170 for test daemon 142A, and instructs those tests to be executed by the test daemons (block 640). Test daemon 142A receives the executable code for test case 170 and executes the test case (block 642). Test daemon 142A reports any failed test or errors in executing test case 170 (block 644). For example, API 282A associated with resource type 224A/B may be inaccessible to test daemon 142A and therefore generate an error logged in an error log that is reported. Testing service 140 receives results from executing test cases 170, 173, and 175 on the various test daemons (block 650). Testing service 140 then compiles test results into a test result report from numerous test daemons along with a list of any untested resource types (e.g., resource type 229A/B) which is not covered by any test case in test repository 145.

Figure 7:
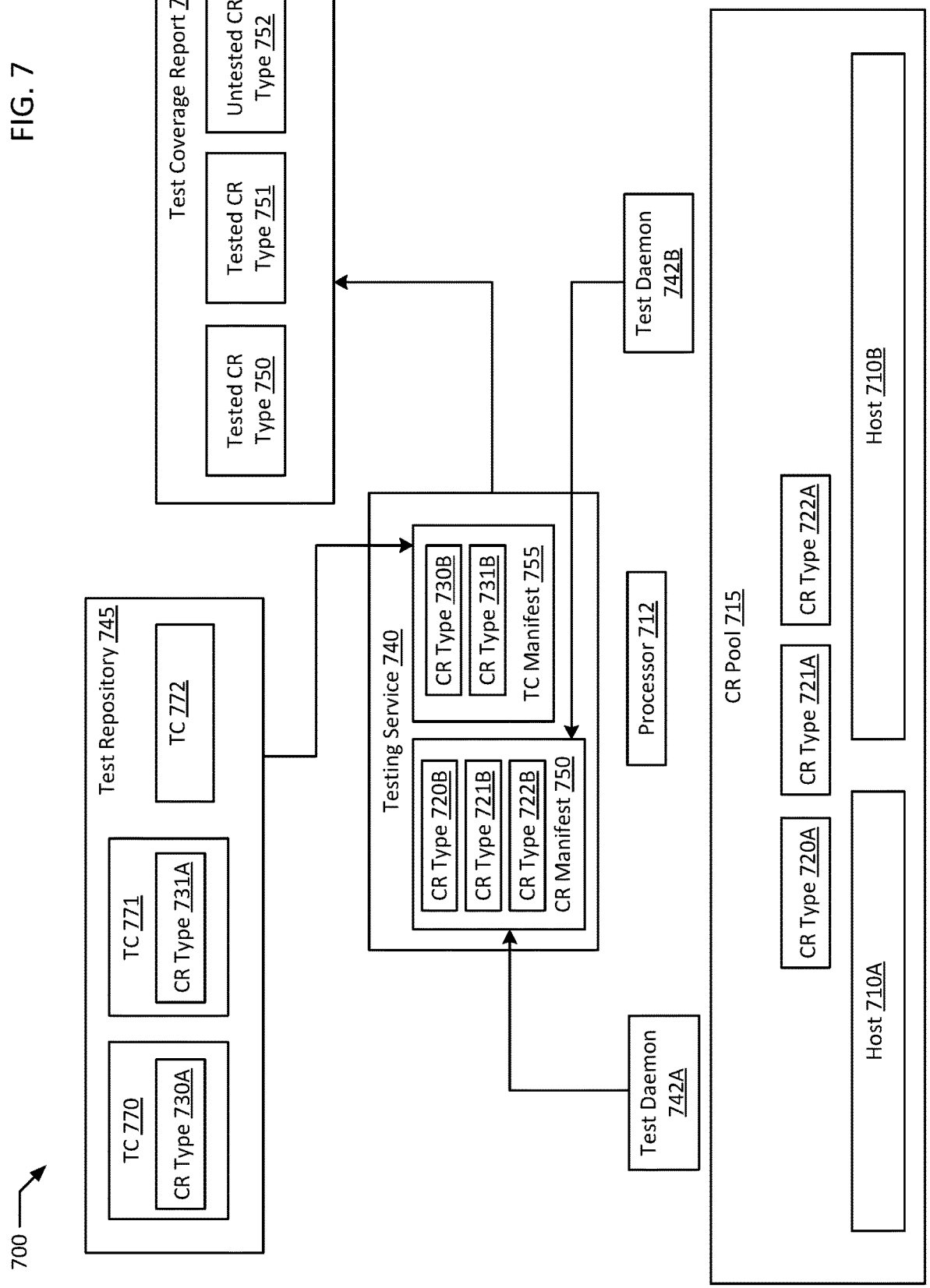
FIG. 7 is a block diagram of a test coverage report generation system according to an example of the present disclosure.

FIG. 7 is a block diagram of a test coverage report generation system according to an example of the present disclosure. Example system 700 includes a computing resource (CR) pool 715 that includes CR types 720A, 721A, and 722A hosted on hosts 710A-B, where CR types 720A-722A are routinely updated. Test repository 745 stores test cases (TC) 770 and 771. Testing service 740 executes on processor 712 to compile, from test daemons 742A-B, a CR manifest 750 of CR types 720A, 721A, and 722A included in CR pool 715. Testing service 740 compiles a TC manifest 755 including CR type 730A corresponding to CR type 720A and 731A corresponding to CR type 721A tested by TCs 770 and 771. CR types 720B, 721B, and 722B (respectively corresponding to CR types 720-721A) included in CR manifest 750 are compared against CR types 730B and 731B (respectively corresponding to CR types 730A and 731A) included in TC manifest 755. A test coverage report 760 is generated of tested CR types 750 and 751 and untested CR type 752. TC 772 is added to test repository 745 based on test coverage report 760.

FIG. 8 is a block diagram of an automated test case execution system according to an example of the present disclosure. Example system 800 includes a computing resource (CR) pool 815 that includes CR types 820, 821, and 822 hosted on hosts 810A-B, where CR types 820-822 are routinely updated. Test repository 845 stores test cases (TC) 870 and 871. Testing service 840 executes on processor 812 to compile TC manifest 855, which includes CR types 830C (corresponding to CR types 820, 830A, and 830B) and 831B (corresponding to CR types 821 and 831A) tested by TCs 870 and 871. Execute subset of TCs 857, including TC 870, which tests each of the CR types represented in TC manifest 855 (e.g., CR types 830C and 831B). A test result report 865 is recorded based on execution results 867 of the subset of TCs 857. Testing Service 830 determines that subset of TCs 857 fails to test untested CR type 852 (corresponding to CR type 822). Test coverage report 860, which includes untested CR type 852, is generated. TC 872 is added to test repository 845 based on untested CR type 852.

Computing resource coverage as disclosed in the present application advantageously allows for automated testing of computing resource allocation from computing resource pools as well as the identification of testing gaps based on existing test cases. A testing service identifies an efficient and effective set of test cases to execute to provide test coverage of allocable resources. In addition the testing service validates that these identified test cases actually invoke proper APIs for testing allocation of the types of resources the tests are purported to test. As a result, significant amounts of processing may be saved that would otherwise be wasted to execute unnecessary and/or defective tests. Test results generated are therefore also improved based on the pre-elimination of potentially invalid results. In addition, by instrumenting a cloud environment and clients connected to the cloud environment with test daemons, resource type discovery and test case execution may be performed from various different locations within the cloud environment with various different levels of permissioning, thereby generating a more comprehensive result set of resource allocation request execution within the environment. Especially in CICD environments where executable code deployment and cloud management software deployment are regularly performed, computing resource coverage allows for added assurance that new deployments do not impact existing code that is executing in the environment.

Software deployment timelines may therefore be accelerated while minimizing potential outages due to incompatibilities.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a computing resource (CR) pool that includes a plurality of CR types hosted on a plurality of hosts, wherein the plurality of CR types are routinely updated; a test repository storing a plurality of test cases (TC); a processor configured to execute a testing service to: compile, from a plurality of test daemons, a CR manifest of the CR types included in the CR pool; compile a TC manifest including CR types tested by the plurality of TCs; compare the CR types included in the CR manifest with the CR types included in the TC manifest; generate a test coverage report of tested and untested CR types; and add a TC to the test repository based on the test coverage report.

In accordance with a 2nd exemplary aspect of the present disclosure, which may be used in combination with any one or more of other aspects described herein (e.g., the 1st aspect), wherein compiling the TC manifest includes determining respective CR types tested by each TC in the plurality of TCs. In accordance with a 3rd exemplary aspect of the present disclosure, which may be used in combination with any one or more of other aspects described herein (e.g., the 2nd aspect), wherein the testing service is configured to: parse a source code of a TC to determine a list of application programming interface (API) calls invoked by the TC; and determine the CR types tested by the TC by comparing the list of API calls invoked by the TC to a master list mapping associations between CR types and API calls. In accordance with a 4th exemplary aspect of the present disclosure, which may be used in combination with any one or more of other aspects described herein (e.g., the 3rd aspect), wherein the testing service identifies that the TC fails to invoke an API call corresponding to a CR type that the TC is labeled for testing, and the testing service is configured to: generate an alert based on the lack of the API call; and remove the CR type from the TC manifest in relation to the TC. In accordance with a 5th exemplary aspect of the present disclosure, which may be used in combination with any one or more of other aspects described herein (e.g., the 2nd aspect), wherein the testing service identifies a subset of TCs out of the plurality of TCs that test, in combination, each of the CR types represented in the TC manifest. In accordance with a 6th exemplary aspect of the present disclosure, which may be used in combination with any one or more of other aspects described herein (e.g., the 5th aspect), wherein the testing service executes each of the TCs in the subset of TCs and reports results of executing the subset of TCs.

In accordance with a 7th exemplary aspect of the present disclosure, which may be used in combination with any one or more of other aspects described herein (e.g., the 1st aspect), wherein a CR type is one of a networking resource, a memory resource, a storage resource, a processor resource, and a graphical processor resource. In accordance with an 8th exemplary aspect of the present disclosure, which may be used in combination with any one or more of other aspects described herein (e.g., the 1st aspect), wherein the plurality of test daemons is deployed to a plurality of endpoints associated with the CR pool. In accordance with a 9th exemplary aspect of the present disclosure, which may be used in combination with any one or more of other aspects described herein (e.g., the 1st aspect), wherein the plurality of CR types is updated based on an update to a CR pool management system of the CR pool, and the testing service is configured to regenerate the CR manifest and the test coverage report based on the updated plurality of CR types.

In accordance with a 10th exemplary aspect of the present disclosure, which may be used in combination with any one or more of other aspects described herein (e.g., the 1st aspect), wherein updating the plurality of CR types includes at least one of adding a new CR type and removing an existing CR type. In accordance with an 11th exemplary aspect of the present disclosure, which may be used in combination with any one or more of other aspects described herein (e.g., the 10th aspect), wherein a plurality of existing CR types are combined into the new CR type. In accordance with a 12th exemplary aspect of the present disclosure, which may be used in combination with any one or more of other aspects described herein (e.g., the 10th aspect), wherein CRs represented by the existing CR type are recategorized as a plurality of new CR types.

In accordance with a 13th exemplary aspect of the present disclosure, which may be used in combination with any one or more of other aspects described herein (e.g., the 1st aspect), wherein the test coverage report is outputted in visual form.

Aspects of the subject matter described herein may be useful alone or in combination with one or more other aspects described herein. In a 14th exemplary aspect of the present disclosure, a system comprises a means for compiling, from a plurality of test daemons, a computing resource (CR) manifest of CR types included in a CR pool hosted on a plurality of hosts, wherein a plurality of CR types included in the CR pool is routinely updated; a means for compiling a test case (TC) manifest including CR types tested by a plurality of TCs stored in a test repository; a means for comparing the CR types included in the CR manifest with the CR types included in the TC manifest; a means for generating a test coverage report of tested and untested CR types; and a means for adding a TC to the test repository based on the test coverage report.

Aspects of the subject matter described herein may be useful alone or in combination with one or more other aspects described herein. In a 15th exemplary aspect of the present disclosure, a computer-readable non-transitory storage medium storing executable instructions, which when executed by a computer system, cause the computer system to: compile, from a plurality of test daemons, a computing resource (CR) manifest of CR types included in a CR pool hosted on a plurality of hosts, wherein a plurality of CR types included in the CR pool is routinely updated; compile a test case (TC) manifest including CR types tested by a plurality of TCs stored in a test repository; compare the CR types included in the CR manifest with the CR types included in the TC manifest; generate a test coverage report of tested and untested CR types; and add a TC to the test repository based on the test coverage report.

Aspects of the subject matter described herein may be useful alone or in combination with one or more other aspects described herein. In a 16th exemplary aspect of the present disclosure, a method comprises compiling, from a plurality of test daemons, a computing resource (CR) manifest of CR types included in a CR pool hosted on a plurality of hosts, wherein a plurality of CR types included in the CR pool is routinely updated; compiling a test case (TC) manifest including CR types tested by a plurality of TCs stored in a test repository; comparing the CR types included in the CR manifest with the CR types included in the TC manifest; generating a test coverage report of tested and untested CR types; and adding a TC to the test repository based on the test coverage report.

In accordance with a 17th exemplary aspect of the present disclosure, which may be used in combination with any one or more of other aspects described herein (e.g., the 14th, 15th, or 16th aspects), further comprises: determining respective CR types tested by each TC in the plurality of TCs. In accordance with an 18th exemplary aspect of the present disclosure, which may be used in combination with any one or more of other aspects described herein (e.g., the 17th aspect), further comprises: parsing, a source code of a TC to determine a list of application programming interface (API) calls invoked by the TC; and determining the CR types tested by the TC by comparing the list of API calls invoked by the TC to a master list mapping associations between CR types and API calls. In accordance with a 19th exemplary aspect of the present disclosure, which may be used in combination with any one or more of other aspects described herein (e.g., the 18th aspect), further comprises: identifying that the TC fails to invoke an API call corresponding to a CR type that the TC is labeled for testing; generating an alert based on the lack of the API call; and removing the CR type from the TC manifest in relation to the TC. In accordance with a 20th exemplary aspect of the present disclosure, which may be used in combination with any one or more of other aspects described herein (e.g., the 17th aspect), identifying a subset of TCs out of the plurality of TCs that tests, in combination, each of the CR types represented in the TC manifest. In accordance with a 21st exemplary aspect of the present disclosure, which may be used in combination with any one or more of other aspects described herein (e.g., the 20th aspect), executing each of the TCs in the subset of TCs; and reporting results of executing the subset of TCs.

In accordance with a 22nd exemplary aspect of the present disclosure, which may be used in combination with any one or more of other aspects described herein (e.g., the 14th, 15th, or 16th aspects), wherein a CR type is one of a networking resource, a memory resource, a storage resource, a processor resource, and a graphical processor resource. In accordance with a 23rd exemplary aspect of the present disclosure, which may be used in combination with any one or more of other aspects described herein (e.g., the 14th, 15th, or 16th aspects), further comprises: deploying the plurality of test daemons to a plurality of endpoints associated with the CR pool. In accordance with a 24th exemplary aspect of the present disclosure, which may be used in combination with any one or more of other aspects described herein (e.g., the 14th, 15th, or 16th aspects), further comprises: updating the plurality of CR types based on an update to a CR pool management system of the CR pool; and regenerating the CR manifest and the test coverage report based on the updated plurality of CR types.

In accordance with a 25th exemplary aspect of the present disclosure, which may be used in combination with any one or more of other aspects described herein (e.g., the 14th, 15th, or 16th aspects), further comprises: updating the plurality of CR types by at least one of adding a new CR type and removing an existing CR type. In accordance with a 26th exemplary aspect of the present disclosure, which may be used in combination with any one or more of other aspects described herein (e.g., the 25th aspect), further comprises: combining a plurality of existing CR types are into the new CR type. In accordance with a 26th exemplary aspect of the present disclosure, which may be used in combination with any one or more of other aspects described herein (e.g., the 25th aspect), further comprises: recategorizing CRs represented by the existing CR type as a plurality of new CR types.

In accordance with a 28th exemplary aspect of the present disclosure, which may be used in combination with any one or more of other aspects described herein (e.g., the 14th, 15th, or 16th aspects), further comprises: outputting the test coverage report in visual form.

Aspects of the subject matter described herein may be useful alone or in combination with one or more other aspects described herein. In a 29th exemplary aspect of the present disclosure, a system comprises a computing resource (CR) pool that includes a plurality of CR types hosted on a plurality of hosts, wherein the plurality of CR types are routinely updated; a test repository storing a plurality of test cases (TC); a processor configured to execute a testing service to: compile a TC manifest including CR types tested by the plurality of TCs; execute, against the CR pool, a subset of TCs of the plurality of TCs that in combination tests each of the CR types represented in the TC manifest; record a test result report based on execution results of the subset of TCs; determine at least one untested CR type of the CR pool that the subset of TCs fails to test; generate a test coverage report including the at least one untested CR type; and add a TC to the test repository that tests the at least one untested CR type.

In accordance with a 30th exemplary aspect of the present disclosure, which may be used in combination with any one or more of other aspects described herein (e.g., the 29th aspect), wherein compiling the TC manifest includes determining respective CR types tested by each TC in the plurality of TCs. In accordance with a 31st exemplary aspect of the present disclosure, which may be used in combination with any one or more of other aspects described herein (e.g., the 30th aspect), wherein metadata associated with a TC of the plurality of TCs stores at least one CR type tested by the TC. In accordance with a 32nd exemplary aspect of the present disclosure, which may be used in combination with any one or more of other aspects described herein (e.g., the 30th aspect), wherein the testing service is configured to: parse a source code of a TC to determine a list of application programming interface (API) calls invoked by the TC; and determine the CR types tested by the TC by comparing the list of API calls invoked by the TC to a master list mapping associations between CR types and API calls. In accordance with a 33rd exemplary aspect of the present disclosure, which may be used in combination with any one or more of other aspects described herein (e.g., the 32nd aspect), wherein the testing service updates metadata associated with the TC after evaluating the source code of the TC. In accordance with a 34th exemplary aspect of the present disclosure, which may be used in combination with any one or more of other aspects described herein (e.g., the 32nd aspect), wherein the testing service identifies that the test case fails to invoke an API call corresponding to a CR type that the TC is labeled for testing, and the testing service is configured to: generate an alert based on the lack of the API call; and remove the CR type from the TC manifest in relation to the TC.

In accordance with a 35th exemplary aspect of the present disclosure, which may be used in combination with any one or more of other aspects described herein (e.g., the 29th aspect), wherein a CR type is one of a networking resource, a memory resource, a storage resource, a processor resource, and a graphical processor resource. In accordance with a 36th exemplary aspect of the present disclosure, which may be used in combination with any one or more of other aspects described herein (e.g., the 29th aspect), wherein a plurality of test daemons is deployed to a plurality of endpoints associated with the CR pool. In accordance with a 37th exemplary aspect of the present disclosure, which may be used in combination with any one or more of other aspects described herein (e.g., the 36th aspect), wherein a test daemon of the plurality of test daemons executes a TC of the subset of TCs.

In accordance with a 38th exemplary aspect of the present disclosure, which may be used in combination with any one or more of other aspects described herein (e.g., the 29th aspect), wherein the plurality of CR types is updated based on an update to a CR pool management system of the CR pool, and the testing service is configured to regenerate the test coverage report after based on a CR manifest generated with the updated plurality of CR types. In accordance with a 39th exemplary aspect of the present disclosure, which may be used in combination with any one or more of other aspects described herein (e.g., the 29th aspect), wherein the test coverage report includes test results from executing the subset of TCs, and the test coverage report is outputted in visual form.

Aspects of the subject matter described herein may be useful alone or in combination with one or more other aspects described herein. In a 40th exemplary aspect of the present disclosure, a system comprises a means for compiling a test case (TC) manifest including computing resource (CR) types tested by a plurality of TCs stored in a test repository; a means for executing, against a CR pool that includes a plurality of CR types hosted on a plurality of hosts, a subset of TCs of the plurality of TCs that in combination tests each of the CR types represented in the TC manifest, wherein the plurality of CR types are routinely updated; a means for recording a test result report based on execution results of the subset of TCs; a means for determining at least one untested CR type of the CR pool that the subset of TCs fails to test; a means for generating a test coverage report including the at least one untested CR type; and a means for adding a TC to the test repository that tests the at least one untested CR type.

Aspects of the subject matter described herein may be useful alone or in combination with one or more other aspects described herein. In a 41st exemplary aspect of the present disclosure, a computer-readable non-transitory storage medium storing executable instructions, which when executed by a computer system, cause the computer system to: compile a test case (TC) manifest including computing resource (CR) types tested by a plurality of TCs stored in a test repository; execute, against a CR pool that includes a plurality of CR types hosted on a plurality of hosts, a subset of TCs of the plurality of TCs that in combination tests each of the CR types represented in the TC manifest, wherein the plurality of CR types are routinely updated; record a test result report based on execution results of the subset of TCs; determine at least one untested CR type of the CR pool that the subset of TCs fails to test; generate a test coverage report including the at least one untested CR type; and add a TC to the test repository that tests the at least one untested CR type.

Aspects of the subject matter described herein may be useful alone or in combination with one or more other aspects described herein. In a 42nd exemplary aspect of the present disclosure, a method comprises compiling a test case (TC) manifest including computing resource (CR) types tested by a plurality of TCs stored in a test repository; executing, against a CR pool that includes a plurality of CR types hosted on a plurality of hosts, a subset of TCs of the plurality of TCs that in combination tests each of the CR types represented in the TC manifest, wherein the plurality of CR types are routinely updated; recording a test result report based on execution results of the subset of TCs; determining at least one untested CR type of the CR pool that the subset of TCs fails to test; generating a test coverage report including the at least one untested CR type; and adding a TC to the test repository that tests the at least one untested CR type.

In accordance with a 43rd exemplary aspect of the present disclosure, which may be used in combination with any one or more of other aspects described herein (e.g., the 40th, 41st, or 42nd aspects), further comprises: determining respective CR types tested by each TC in the plurality of TCs. In accordance with a 44th exemplary aspect of the present disclosure, which may be used in combination with any one or more of other aspects described herein (e.g., the 43rd aspect), wherein metadata associated with a TC of the plurality of TCs stores at least one CR type tested by the TC. In accordance with a 45th exemplary aspect of the present disclosure, which may be used in combination with any one or more of other aspects described herein (e.g., the 43rd aspect), further comprises: parsing a source code of a TC to determine a list of application programming interface (API) calls invoked by the TC; and determining the CR types tested by the TC by comparing the list of API calls invoked by the TC to a master list mapping associations between CR types and API calls. In accordance with a 46th exemplary aspect of the present disclosure, which may be used in combination with any one or more of other aspects described herein (e.g., the 45th aspect), further comprises: updating metadata associated with the TC after evaluating the source code of the TC. In accordance with a 47th exemplary aspect of the present disclosure, which may be used in combination with any one or more of other aspects described herein (e.g., the 45th aspect), further comprises: identifying that the test case fails to invoke an API call corresponding to a CR type that the TC is labeled for testing; generating an alert based on the lack of the API call; and removing the CR type from the TC manifest in relation to the TC.

In accordance with a 48th exemplary aspect of the present disclosure, which may be used in combination with any one or more of other aspects described herein (e.g., the 40th, 41st, or 42nd aspects), wherein a CR type is one of a networking resource, a memory resource, a storage resource, a processor resource, and a graphical processor resource. In accordance with a 49th exemplary aspect of the present disclosure, which may be used in combination with any one or more of other aspects described herein (e.g., the 40th, 41st, or 42nd aspects), further comprises: deploying a plurality of test daemons to a plurality of endpoints associated with the CR pool. In accordance with a 50th exemplary aspect of the present disclosure, which may be used in combination with any one or more of other aspects described herein (e.g., the 49th aspect), further comprises: executing, by a test daemon of the plurality of test daemons, a TC of the subset of TCs.

In accordance with a 51st exemplary aspect of the present disclosure, which may be used in combination with any one or more of other aspects described herein (e.g., the 40th, 41st, or 42nd aspects), further comprises: updating the plurality of CR types based on an update to a CR pool management system of the CR pool; and regenerating the test coverage report based on a CR manifest generated with the updated plurality of CR types. In accordance with a 52nd exemplary aspect of the present disclosure, which may be used in combination with any one or more of other aspects described herein (e.g., the 40th, 41st, or 42nd aspects), wherein the test coverage report includes test results from executing the subset of TCs, and the test coverage report is outputted in visual form.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
compiling, from a plurality of test daemons each deployed to a respective virtual machine (VM), a computing resource (CR) manifest of CR types included in a CR pool hosted on a plurality of hosts, wherein a plurality of CR types include CR types that are unavailable on any individual host and are pooled together from multiple hosts, and the plurality of CR types are routinely updated;
compiling a test case (TC) manifest including CR types tested by a plurality of TCs stored in a test repository, wherein at least one TC is determined to be mislabeled by parsing source code of the at least one TC to determine whether an application programming interface (API) is invoked for testing allocation of at least one CR type that the TC is labeled for on the respective VM, and each TC of the plurality of TCs determined to be mislabeled is omitted from the TC manifest;
comparing the CR types included in the CR manifest with the CR types included in the TC manifest;
generating a test coverage report of tested and untested CR types; and
adding a TC to the test repository based on at least one untested CR type included in the test coverage report.

2. A system comprising:
a computing resource (CR) pool that includes a plurality of CR types hosted on a plurality of hosts, wherein the plurality of CR types include CR types that are unavailable on any individual host and are pooled together from multiple hosts, and the plurality of CR types are routinely updated;
a test repository storing a plurality of test cases (TCs); and
a processor configured to execute a testing service to:
compile, from a plurality of test daemons each deployed to a respective virtual machine (VM), a CR manifest of the CR types included in the CR pool;
compile a TC manifest including CR types tested by the plurality of TCs, wherein at least one TC is determined to be mislabeled by parsing source code of the at least one TC to determine whether an application programming interface (API) is invoked for testing allocation of at least one CR type that the TC is labeled for on the respective VM, and each TC of the plurality of TCs determined to be mislabeled is omitted from the TC manifest;
compare the CR types included in the CR manifest with the CR types included in the TC manifest;
generate a test coverage report of tested and untested CR types; and
add a TC to the test repository based on at least one untested CR type included in the test coverage report.

3. The system of claim 2, wherein compiling the TC manifest includes determining respective CR types tested by each TC in the plurality of TCs.

4. The system of claim 3, wherein the testing service is configured to:
parse a source code of a TC to determine a list of API calls invoked by the TC; and
determine the CR types tested by the TC by comparing the list of API calls invoked by the TC to a master list mapping associations between CR types and API calls.

5. The system of claim 4, wherein the testing service identifies that the TC fails to invoke an API call corresponding to a CR type that the TC is labeled for testing, and the testing service is configured to:
generate an alert based on the lack of the API call; and
remove the CR type from the TC manifest in relation to the TC.

6. The system of claim 3, wherein the testing service identifies a subset of TCs out of the plurality of TCs that test, in combination, each of the CR types represented in the TC manifest, executes each of the TCs in the subset of TCs, and reports results of executing the subset of TCs.

7. The system of claim 2, wherein a CR type is one of a networking resource, a memory resource, a storage resource, a processor resource, or a graphical processor resource.

8. The system of claim 2, wherein the plurality of test daemons is deployed to a plurality of endpoints associated with the CR pool.

9. The system of claim 2, wherein the plurality of CR types is updated based on an update to a CR pool management system of the CR pool, and the testing service is configured to regenerate the CR manifest and the test coverage report based on the updated plurality of CR types.

10. The system of claim 2, wherein updating the plurality of CR types includes at least one of adding a new CR type or removing an existing CR type.

11. The system of claim 10, wherein a plurality of existing CR types are combined into the new CR type.

12. The system of claim 10, wherein CRs represented by the existing CR type are recategorized as a plurality of new CR types.

13. A system comprising:
a computing resource (CR) pool that includes a plurality of CR types hosted on a plurality of hosts, wherein the plurality of CR types include CR types that are unavailable on any individual host and are pooled together from multiple hosts, and the plurality of CR types are routinely updated;

a plurality of test daemons each deployed to a respective virtual machine (VM);

a test repository storing a plurality of test cases (TCs); and a processor configured to execute a testing service to:

compile a TC manifest including CR types tested by the plurality of TCs, wherein at least one TC is determined to be mislabeled by parsing source code of the at least one TC to determine whether an application programming interface (API) is invoked for testing allocation of at least one CR type that the TC is labeled for on the respective VM, and each TC of the plurality of TCs determined to be mislabeled is omitted from the TC manifest;

execute, against the CR pool, a subset of TCs of the plurality of TCs that in combination tests each of the CR types represented in the TC manifest;

record a test result report based on execution results of the subset of TCs;

determine at least one untested CR type of the CR pool that the subset of TCs fails to test;

generate a test coverage report including the at least one untested CR type; and add a TC to the test repository that tests the at least one untested CR type.

14. The system of claim 13, wherein compiling the TC manifest includes determining respective CR types tested by each TC in the plurality of TCs, and metadata associated with a TC of the plurality of TCs stores at least one CR type tested by the TC.

15. The system of claim 14, wherein the testing service is configured to:

parse a source code of a TC to determine a list of API calls invoked by the TC;

determine the CR types tested by the TC by comparing the list of API calls invoked by the TC to a master list mapping associations between CR types and API calls; and update metadata associated with the TC after evaluating the source code of the TC.

16. The system of claim 15, wherein the testing service identifies that the TC fails to invoke an API call corresponding to a CR type that the TC is labeled for testing, and the testing service is configured to:

generate an alert based on the lack of the API call; and remove the CR type from the TC manifest in relation to the TC.

17. The system of claim 13, wherein a CR type is one of a networking resource, a memory resource, a storage resource, a processor resource, or a graphical processor resource.

18. The system of claim 13, wherein the plurality of test daemons is deployed to a plurality of endpoints associated with the CR pool, and a test daemon of the plurality of test daemons executes a TC of the subset of TCs.

19. The system of claim 13, wherein the plurality of CR types is updated based on an update to a CR pool management system of the CR pool, and the testing service is configured to regenerate the test coverage report based on a CR manifest generated with the updated plurality of CR types.

20. The system of claim 13, wherein the test coverage report includes test results from executing the subset of TCs, and the test coverage report is outputted in visual form.

* * * * *